United States Patent
Cordella et al.

(10) Patent No.: US 7,409,235 B2
(45) Date of Patent: Aug. 5, 2008

(54) VEHICLE EQUIPPED WITH AN ON-VEHICLE TELECOMMUNICATION SYSTEM COMMUNICATING WITH A USER PORTABLE COMMUNICATION DEVICE HOUSED IN A SHIELDING ENVIRONMENT

(75) Inventors: Giuseppe Faranda Cordella, Orbassano (IT); Michela Audone, Orbassano (IT)

(73) Assignee: C.R.F. Societa Consortile Per Azioni, Orbassano (IT)

( * ) Notice: Subject to any disclaimer, the term of this patent is extended or adjusted under 35 U.S.C. 154(b) by 894 days.

(21) Appl. No.: 10/871,558

(22) Filed: Jun. 18, 2004

(65) Prior Publication Data

US 2005/0037825 A1 Feb. 17, 2005

(30) Foreign Application Priority Data

Jun. 20, 2003 (IT) .......................... TO2003A0470

(51) Int. Cl.
*H04Q 7/32* (2006.01)

(52) U.S. Cl. .............. 455/569.2; 455/569.1; 455/575.1; 455/575.7; 455/345; 455/344; 343/702; 343/705; 343/708; 343/712; 343/713

(58) Field of Classification Search .............. 455/569.1, 455/569.2, 575.1, 575.5, 575.7, 550.1, 575.9, 455/345, 344, 346, 347, 403, 422.1, 500, 455/517, 73, 90.1, 90.2, 90.3; 343/700, 702, 343/705, 708, 712, 713

See application file for complete search history.

(56) References Cited

U.S. PATENT DOCUMENTS

| | | | |
|---|---|---|---|
| 4,740,794 A | 4/1988 | Phillips et al. | 343/702 |
| 5,493,702 A | 2/1996 | Crowley et al. | 455/89 |
| 6,191,745 B1 * | 2/2001 | Heed | 343/713 |
| 6,229,490 B1 | 5/2001 | Hofmann | 343/702 |
| 2004/0036658 A1 * | 2/2004 | Schlieber et al. | 343/713 |
| 2004/0229607 A1 * | 11/2004 | La Chapelle et al. | 455/431 |

FOREIGN PATENT DOCUMENTS

| | | |
|---|---|---|
| DE | 195 31 415 A1 | 2/1997 |
| JP | 11-227536 | 8/1999 |

* cited by examiner

*Primary Examiner*—Keith T Ferguson
(74) *Attorney, Agent, or Firm*—Seed IP Law Group PLLC

(57) ABSTRACT

A vehicle equipped with an on-vehicle telecommunication system having an electromagnetic field shielding case installed in the vehicle and for housing a user portable communication device, which has a first communication module permitting, via a first antenna, short-range radio-frequency transmission and reception, and a second antenna permitting long-range radio-frequency transmission and reception to and from a remote radio-base station. The on-vehicle telecommunication system also has a third antenna installed in the shielding case; a second communication module connected to the third antenna to permit, inside the shielding case, short-range radio-frequency communication with the first communication module of the user portable communication device; and a user interface device, which is installed in the vehicle, is connected to the second communication module, and permits remote use by a user of the user portable communication device to effect long-range radio-frequency transmission and reception to and from the remote radio-base station.

18 Claims, 4 Drawing Sheets

VEHICLE EQUIPPED WITH AN ON-VEHICLE TELECOMMUNICATION SYSTEM COMMUNICATING WITH A USER PORTABLE COMMUNICATION DEVICE HOUSED IN A SHIELDING ENVIRONMENT

BACKGROUND OF THE INVENTION

1. Field of the Invention

The present invention relates to a vehicle equipped with an on-vehicle telecommunication system communicating with a user portable communication device housed in a shielding environment.

2. Description of the Related Art

As is known, many last-generation vehicles are equipped with an on-vehicle computer by which a vehicle user, e.g., the driver, can key in various commands to display vehicle travel data, or can dial a telephone number to communicate telephonically with a remote radio-base station using a speaker device integrated in the on-vehicle computer.

If available, however, the driver of the vehicle very often prefers to use a personal cellular telephone—which the driver is more skilled in using, and which affords a wide range of functions—thus posing serious hazards in terms of road safety.

To prevent such improper use of cellular telephones, regulations have recently been introduced prohibiting use of cellular telephones by the driver while driving the vehicle.

Moreover, any telephone communication involving radio-frequency signals is known to be accompanied by the generation of very strong electromagnetic fields, which recent studies have shown to be extremely harmful to human health, especially in the event of prolonged exposure.

SUMMARY OF THE INVENTION

One object of the present invention to provide a vehicle equipped with an on-vehicle or other portable device telecommunication system enabling a user to communicate telephonically over a personal cellular telephone using the on-vehicle telecommunication system, and which at the same time provides for shielding the occupants of the vehicle passenger compartment from electromagnetic radiation generated during such telephone communication.

According to the present invention, there is provided a vehicle equipped with an on-vehicle telecommunication system; the on-vehicle telecommunication system being characterized by comprising shielding housing means for a user portable communication device, which has first antenna means and first communication means connected to said first antenna means to permit short-range radio-frequency transmission and reception, and second antenna means permitting long-range radio-frequency transmission and reception to and from a remote radio-base station; said on-vehicle telecommunication system comprising third antenna means installed inside said shielding housing means; second communication means connected to said third antenna means to permit, inside said shielding housing means, short-range radio-frequency communication with said first communication means of said user portable communication device; and user interface means, which are installed in said vehicle, are connected to said second communication means, and permit remote use by a user of said user portable communication device to effect said long-range radio-frequency transmission and reception.

The present invention may be used to advantage, though not exclusively, in automotive applications, to enable a vehicle user, e.g., the driver, to communicate telephonically over a personal cellular telephone, using the on-vehicle telecommunication system, to which application the following description refers purely by way of example.

In fact, the present invention may be used on any type of transport vehicle equipped with an on-vehicle telecommunication system, e.g., an aircraft, to enable the user of the transport vehicle to communicate over a personal portable communication device using the on-vehicle telecommunication system of the transport vehicle.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
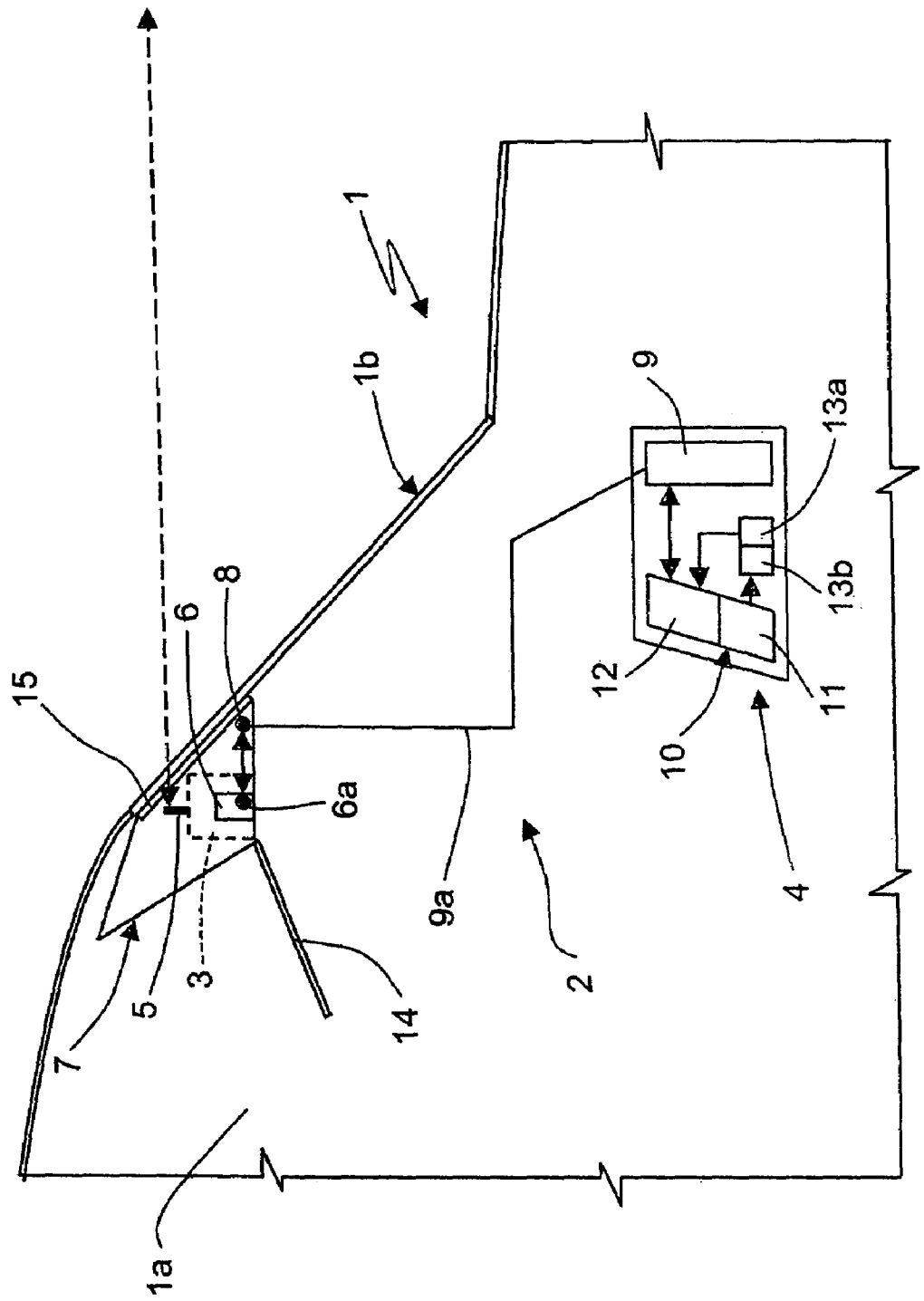
FIG. 1 shows schematically a portion of a vehicle equipped with an on-vehicle telecommunication system in accordance with the teachings of the present invention.

Number 1 in FIG. 1 indicates partly a vehicle equipped with an on-vehicle telecommunication system 2 permitting radio-frequency communication, inside a shielding environment, between an on-vehicle computer 4, installed on vehicle 1, and a user portable communication device 3, and between user portable communication device 3 and a remote radio-base station (not shown). In other words, on-vehicle telecommunication system 2 provides for shielding the occupants of the passenger compartment 1a of vehicle 1 from the electromagnetic fields generated during communication between on-vehicle computer 4 and portable communication device 3, and during telephonic transmission and reception between portable communication device 3 and the remote radio-base station (not shown).

Portable communication device 3 is preferably, though not necessarily, defined by a cellular telephone, which comprises an antenna 5 preferably, though not necessarily, projecting outwards of the main casing of the cellular telephone, and permitting long-range radio-frequency transmission and reception to and from the remote radio-base station (not shown); and a short-range radio-frequency communication module 6 which, by means of an antenna 6a, permits short-range radio-frequency communication to a known wireless standard, e.g., the Bluetooth or IEEE 802.11b standard. The cellular telephone is known and therefore not described in detail.

With reference to FIG. 1, in addition to on-vehicle computer 4, on-vehicle telecommunication system 2 also comprises an electromagnetic field shielding case 7 which defines said shielding environment, is located inside passenger compartment 1a of vehicle 1, and houses user portable communication device 3; a first transmitting-receiving antenna 8 housed inside shielding case 7; and a communication module 9 which is connected over a communication cable 9a to first transmitting-receiving antenna 8, and permits, by means of first transmitting-receiving antenna 8, short-range radio-frequency communication with antenna 6a of communication module 6 of user portable communication device 3.

On-vehicle computer 4 comprises an interface device 10 connected to communication module 6 and allowing the user to remotely enable user portable communication device 3 housed inside shielding case 7, so as to communicate with the remote radio-base station (not shown).

More specifically, interface device 10 comprises a control device 11, e.g., a keyboard, by which the user imparts commands to on-vehicle computer 4 and/or to user portable communication device 3, such as dialing a telephone number, writing a message for transmission, or any other function typically performed by cellular telephones; a display device 12 for displaying, for example, the number to be dialed, the calling number, or other useful telephone information; a sound pickup device 13a, e.g., a microphone; and a sound reproducing device 13b.

Figure 2:
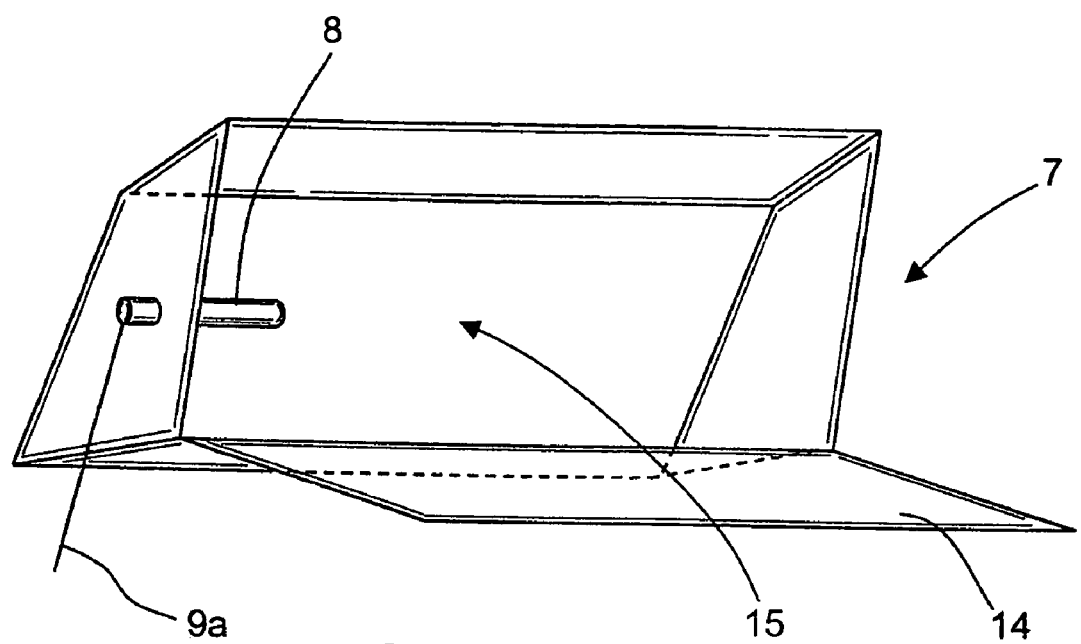
FIG. 2 shows a front view in perspective of a shielding case forming part of the vehicle equipped with an on-vehicle telecommunication system as shown in FIG. 1.

With reference to the FIG. 2 example, shielding case 7 is preferably, though not necessarily, parallelepiped-shaped, and is sized to house user portable communication device 3.

The walls of shielding case 7 are made of shielding material, such as steel, aluminum, copper alloy or copper clad material, or any material or alloy preventing escape of the electromagnetic waves generated inside shielding case 7.

With reference to FIGS. 1 and 2, shielding case 7 also comprises a door 14 enabling access to the inside of shielding case 7 to insert user portable communication device 3 inside the shielding case. To ensure maximum shielding by shielding case 7, door 14 may be fitted with a number of radio-frequency seals (not shown) for optimizing the shielding performance of shielding case 7 when door 14 is closed.

The body of shielding case 7 has a window 15 transparent to radio-frequency signals, i.e., through which the radio-frequency signals generated by antenna 5 of user portable communication device 3 during communication of user portable communication device 3 with the remote radio-base station (not shown) travel, with no attenuation of the radio-frequency signals. More specifically, window 15 may be defined by an outward opening formed in one wall of shielding case 7, or by an opening closed by any material that is transparent or generally transparent to radio-frequency signals, i.e., any "non-shielding" material, such as plastic resin, glass, automobile windshield type glass, or similar materials producing little or no attenuation of the radio-frequency signals.

With reference to FIG. 1, shielding case 7 may be fixed integrally inside passenger compartment 1a of vehicle 1, so that window 15 faces outwards of vehicle 1 to direct transmission of the radio-frequency signals, i.e., the electromagnetic radiation beam, traveling through window 15, outwards in the opposite direction to the passenger compartment housing the occupants and the electronic systems of vehicle 1.

More specifically, shielding case 7 may be fitted integrally to an inner wall of the vehicle, at any window or opening "transparent" to radio-frequency signals (any non-shielding window or opening). In the FIG. 1 example, shielding case 7 is fixed to the windscreen 1b of vehicle 1, with window 15 facing windscreen 1b, but may obviously be fixed at existing holes or openings in the passenger compartment of vehicle 1, with window 15 facing the holes or openings.

In actual use, by means of on-vehicle computer 4, the user can enable any function performed by user portable communication device 3 housed inside shielding case 7. In the example shown, the commands entered by the user on keyboard 11 are coded and communicated by on-vehicle computer 4 to communication module 9, by which they are transmitted, in the form of short-range radio-frequency signals, by means of first transmitting-receiving antenna 8.

Communication module 6 of user portable communication device 3 receives the radio-frequency signals transmitted by first transmitting-receiving antenna 8, and enables the user-requested functions. For example, when telephone communication between portable communication device 3 and the remote radio-base station is enabled, antenna 5 provides for receiving/transmitting, through window 15 of shielding case 7, the long-range radio-frequency signals coding the telephone information, and, at the same time, communication module 6 and first transmitting-receiving antenna 8 provide for short-range radio-frequency transmission and reception of the telephone information, which is thus exchanged with communication module 9 and, therefore, on-vehicle computer 4. Vocal (speaker) communication with the remote radio-base station can be enabled by the vehicle user by means of sound detecting and sound reproducing devices 13a and 13b connected to on-vehicle computer 4.

On-vehicle telecommunication system 2 is extremely advantageous by ensuring a high degree of protection of the occupants and electronic systems in the vehicle against the electromagnetic fields generated during telephone communication using a cellular telephone inside the vehicle. That is, long-range radio-frequency transmission (between the cellular telephone and remote radio-base station) is "conveyed" outwards of passenger compartment 1a of the vehicle in the opposite direction to the occupants, thus safeguarding the occupants from exposure to the electromagnetic wave beam, while short-range radio-frequency transmission (between the cellular telephone and on-vehicle computer) is contained within shielding case 7 which prevents any outward radiation.

On-vehicle telecommunication system 2 also has the advantage of being extremely straightforward and practical: user portable communication device 3 need simply be placed inside shielding case 7 to enable telephone communication by means of on-vehicle computer 4.

Figure 3:
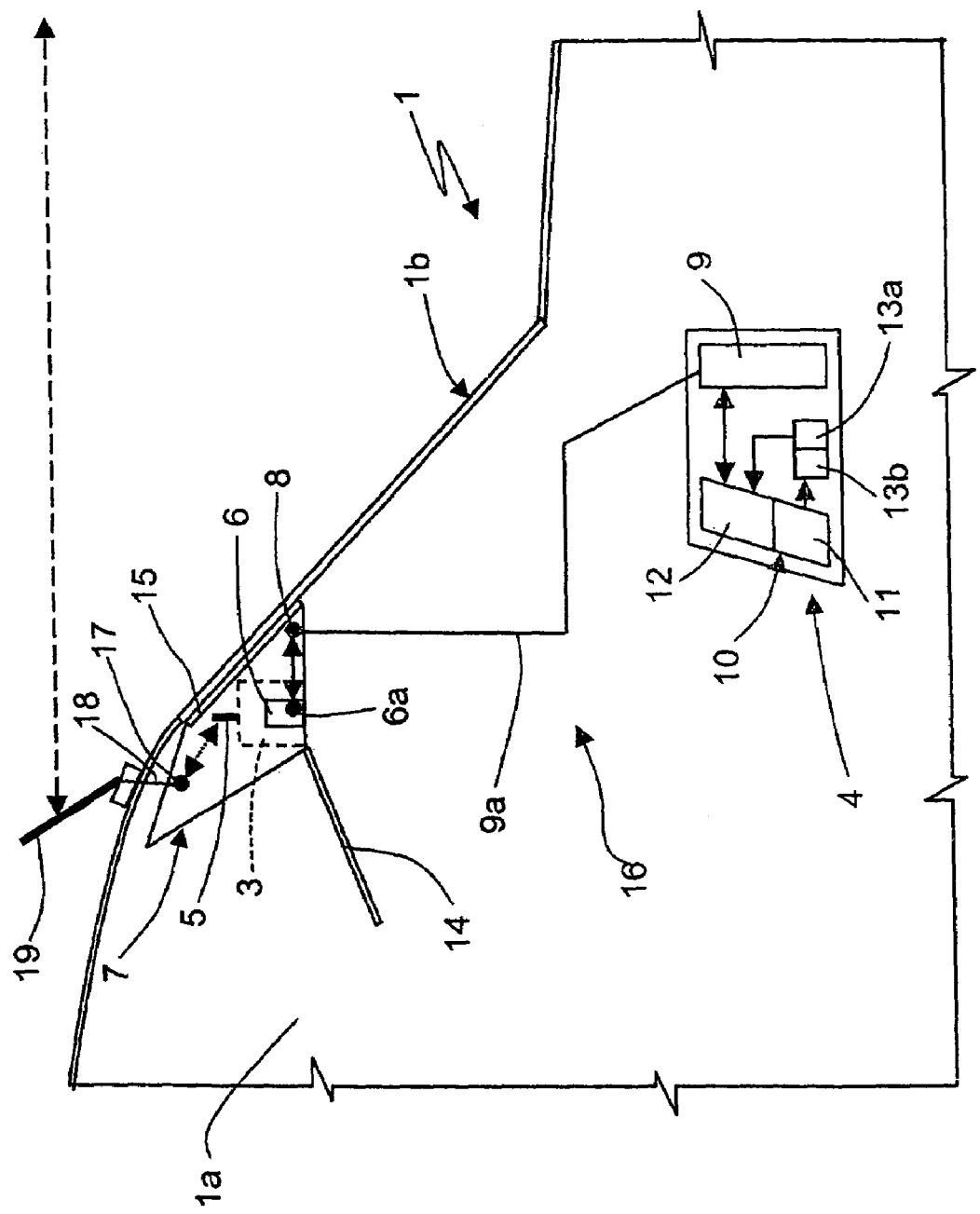
FIG. 3 shows schematically a Variation of the FIG. 1 on-vehicle telecommunication system.

The FIG. 3 embodiment relates to an on-vehicle telecommunication system 16 similar to on-vehicle telecommunication system 2, and the component parts of which are indicated, where possible, using the same reference numbers as for the corresponding component parts of on-vehicle telecommunication system 2.

Shielding case 7 of on-vehicle telecommunication system 16 is also substantially parallelepiped-shaped with a door 14 for insertion/removal of portable communication device 3, but, unlike shielding case 7 of on-vehicle telecommunication system 2, has no non-shielding window 15 permitting outward passage of the long-range radio-frequency signals generated by portable communication device 3 inside shielding case 7. In other words, shielding case 7 of on-vehicle telecommunication system 16 is fully closed, i.e., made entirely of shielding material, so as to prevent or greatly reduce outward passage of any radio-frequency signals exchanged inside between user portable communication device 3 and the remote radio-base station, and between user portable communication device 3 and communication module 9 of on-vehicle computer 4.

Figure 4:
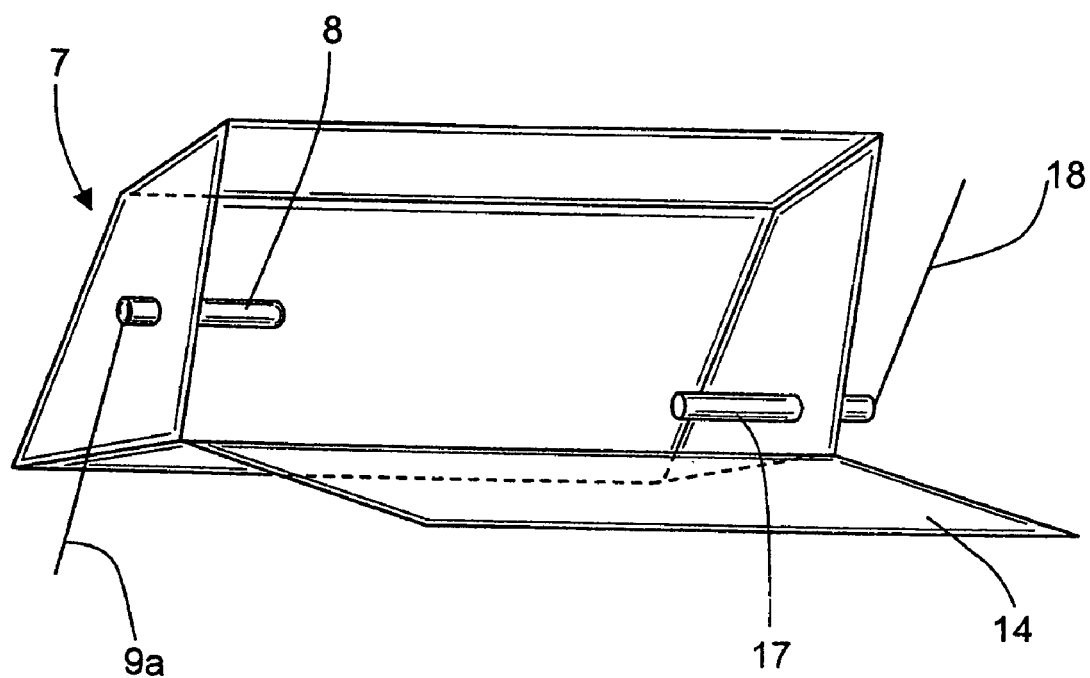
FIG. 4 shows a front view in perspective of a shielding case forming part of the FIG. 3 on-vehicle telecommunication system.

With reference to FIGS. 3 and 4, on-vehicle telecommunication system 16 comprises a second transmitting-receiving antenna 17 installed inside shielding case 7 and connected by a transmission means 18, e.g., a coaxial cable of waveguide, to a vehicle antenna 19 located outside shielding case 7 and for transmitting and receiving to and from the remote radio-base station (not shown).

In connection with the above, it should be pointed out that, by providing for full outward shielding of electromagnetic fields, shielding case 7 of on-vehicle telecommunication system 16 may advantageously be fixed anywhere inside passenger compartment 1a of vehicle 1.

Vehicle antenna 19 may be defined by the antenna fitted outside the passenger compartment of vehicle 1; while transmitting-receiving antenna 17 may be defined, for example, by a horn antenna 17a (shown schematically in the FIG. 5 example) comprising, for example, an inner surface portion of a wall of shielding case 7, or by a dipole antenna comprising, for example, an end portion of a coaxial cable connecting the dipole antenna to vehicle antenna 19, or by a capacitive antenna.

Clearly, changes may be made to the system as described and illustrated herein without, however, departing from the scope of the present invention.

In particular, as opposed to shielding case 7, the shielding environment may be defined by any housing formed inside vehicle 1.

Figure 5:
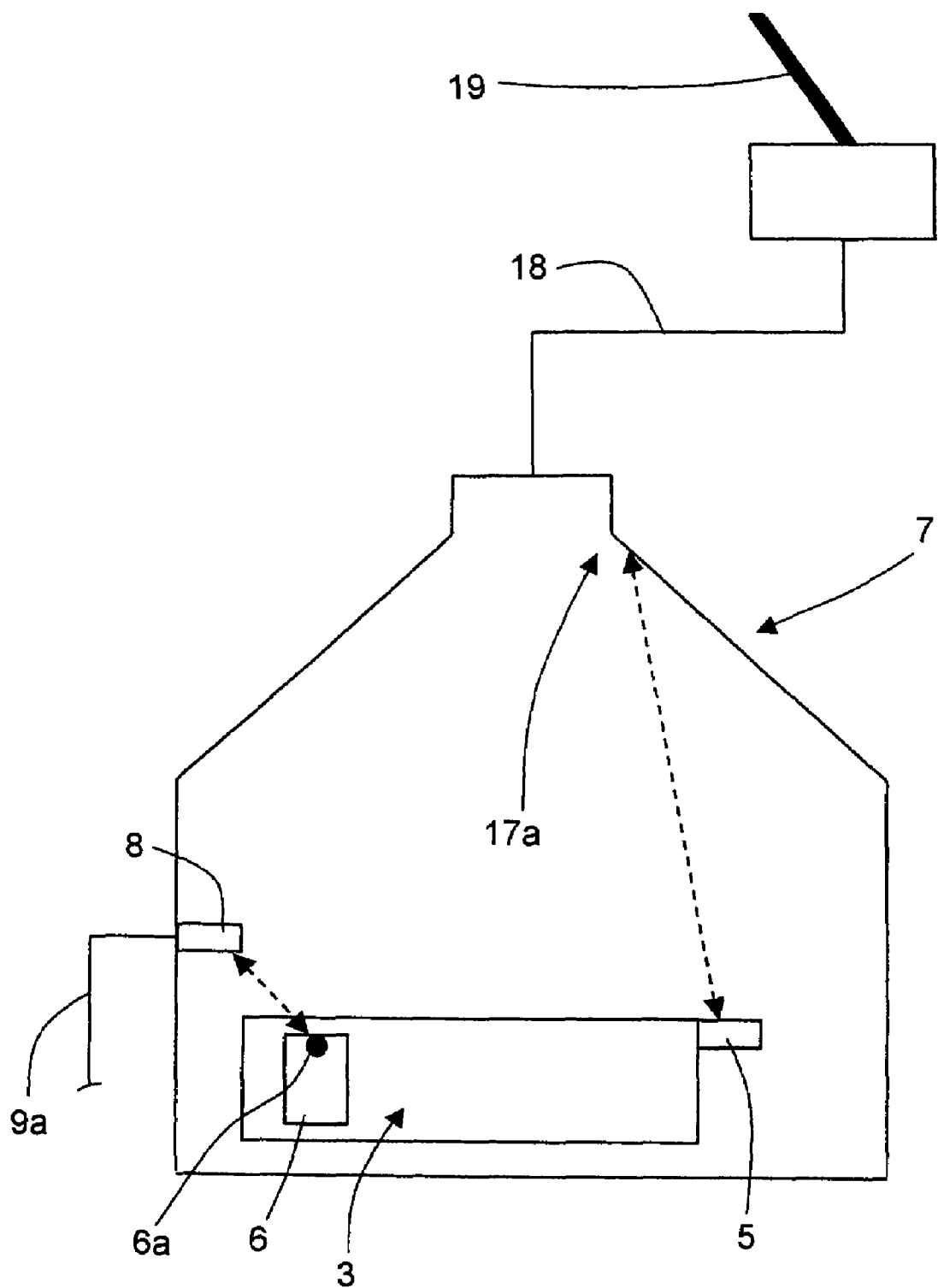
FIG. 5 shows a schematic view of the FIG. 3 shielding case equipped with a horn antenna.

As a further alternative embodiment, the antenna 19 shown in FIGS. 3 and 5 can be an antenna from the already existing vehicle onboard system and radio communication thus making an additional antenna 17 unnecessary. In particular, according to this alternative embodiment, the onboard communication system 4 presently existing on the vehicle is currently connected to an antenna outside the vehicle, such as antenna 19 or some other existing antenna. The transmission occurs between cellular phone 3 and the local, onboard communication system 4 via antennas systems 6a and 8. Once the transmission occurs between the antenna 6a and 8, the communication link is established between the cellular phone 3 and the onboard communication system 4. The onboard communication system 4 has its own output antenna 21 to which it is connected by appropriate electrical coupling, such as a cable, wireless, or other communication link which outputs a signal. Such an output signal uses the car power system in order to power the antenna 19. Further, the size and shape and location of the antenna 19 is selected by the car manufacturer to be a preferred location based on ease of manufacture, sufficient radio transmission capabilities, clear signal, etc. In such a case, the already existing transmission system in the vehicle is used to output the communication link which originates in the cellular phone 3. Accordingly, a user is able to place the cellular phone 3 inside the shielded housing 7 and link to the onboard communication system 4 to use such system keypad and display. The cellular telephone is one of the links in the system so that stored numbers can be issued from the cell phone and also the data regarding the phone call passes through the cell phone. The antenna generating the actual output transmission is one directly linked to the onboard communication system 4, and otherwise used by it for its communication.

In yet a further alternative embodiment from the one just described above, the cellular telephone 3 is not placed inside the shielded housing 7. Instead, the cellular telephone 3 can be held in the hand by the user, a passenger, or placed in other locations so that it may be used as the keypad and as the primary communication device for the user, including the microphone and the speaker. When the cellular telephone 3 is within the vehicle 1, the high-power output antenna 5 is disabled and not used. By using a low-power short-range signal, danger of electromagnetic radiation to the user from the transmission of high-powered signals is greatly reduced. Thus, when the user is within the vehicle, no strong electromagnetic filter is generated inside the cell phone adjacent the hand or the head of the user. Instead, only an extremely low-power, weak radio transmission occurs from the cellular phone to the antenna 8, which is so close, the power output is extremely low and any generated electromagnetic fields are extremely weak and do not have any effect on the user. In such a case, the shielding housing 7 is not necessary at all and is omitted completely. When the cellular telephone 3 senses that it is within range of a local, low-power antenna 8, such as a Bluetooth frequency antenna, it will disable the high-power antenna 5 and enable only the low-power antenna 6a. In this way, high-power transmissions do not exist whenever the user is within radio range of a low-power system. A Bluetooth based antenna which may be in the home, in a vehicle, in a building, or in a business. If the user is on a cell phone and transitions from adjacent a Bluetooth transmission system using antenna 6a so the signal strength becomes weak, the system may automatically enable high-powered antenna 5 so that, for those periods of time when the low-power transmission is not acceptable, the high-powered antenna 5 is enabled. All these changes can be made without involving the user, so that the user does not realize that the change has taken place. Thus, the Bluetooth transmission system is present in the user's home and the user is talking on the cell phone, the transmission can be occurring via the Bluetooth radio frequency within the home with the high-powered antenna being a local antenna inside the user's home. For brief period of time, the antenna 5 may be enabled to continue the same conversation via the high-powered antenna and then, once the user enters the vehicle, the cell phone switches back to the low-frequency, Bluetooth communication via antenna 6a and antenna 8 once again, and disables the high-powered antenna 5.

Second, The power output from the cell phone will be substantially reduced. Only a low-power signal need be transmitted, the high-power output required for a long-distance transmission over several kilometers, the antenna 5 will not be required and only small amount of power will be necessary for the low-power, short-distance transmission, thus substantially saving on battery power life and other components.

A third advantage is that the communication link can be substantially more clear and static-free with the low likelihood that the communication link will be lost during the communication session. In particular, with reference to the advantage number 3, the antenna 19 has a power source other than the battery power of the cell phone. This power source may be substantially larger and provide a boosted signal output beyond that which the cell phone is capable of providing. Further, it may be made of high quality components that are too heavy for a cell phone and are attuned to a local cellular tower. In addition, the shape of antenna 19 and its location, whether in the home or in an automobile, may be more particularly sized so as to provide clear communication over a radio signal since it is not limited in overall size dimensions such as a cell phone antenna. Further, the power considerations regarding saving the battery and also keeping low emissions to not affect the user who may have the cell phone adjacent to their ear, are not present in a communication system using antenna 19, and therefore the power may be boosted considerably beyond that which is permitted in cell phones. Accordingly, the signal may be more static-free and have a more solid connection than is often possible on cell phones. Further, the inconvenient situation in which a cell phone signal is suddenly lost during the middle of a conversation is less likely to occur using the communication link of antenna 19 for the outside connection and the Bluetooth frequency range between antennas 6a and 8.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A vehicle equipped with an on-vehicle telecommunication system comprising: shielding housing means for shielding a user portable communication device, which has first antenna means and first communication means connected to said first antenna means for permitting short-range radio-frequency transmission and reception, and second antenna means for permitting long-range radio-frequency transmission and reception to and from a remote radio-base station; said on-vehicle telecommunication system further comprising third antenna means installed inside said shielding housing means; second communication means connected to said third antenna means for permitting, inside said shielding housing means, short-range radio-frequency communication with said first communication means of said user portable communication device; and user interface means, which are installed in said vehicle, are connected to said second communication means, for permitting remote use by a user of said user portable communication device to effect said long-range radio-frequency transmission and reception.

2. A vehicle as claimed in claim 1, characterized in that said shielding housing means comprise a window transparent to radio-frequency signals and so oriented as to permit passage of the radio-frequency signals outwards of the vehicle.

3. A vehicle as claimed in claim 2, characterized in that said window is defined by a closed opening made of non-shielding material transparent to radio-frequency signals.

4. A vehicle as claimed in claim 2, characterized in that said window is defined by an opening formed in the body of said shielding housing means.

5. A vehicle as claimed in claim 2, characterized in that said shielding housing means comprise a shielding case fixed integrally to a wall of said vehicle transparent to said radio-frequency signals.

6. A vehicle as claimed in claim 5, characterized in that said shielding case is fixed integrally to the windscreen of said vehicle.

7. A vehicle as claimed in claim 6, characterized in that said shielding case is positioned with said window facing said windscreen of said vehicle.

8. A vehicle as claimed in claim 1, characterized in that said shielding housing means are closed.

9. A vehicle as claimed in claim 8, characterized by comprising fourth antenna means installed inside said shielding housing means and connected to fifth antenna means located in said vehicle and outside said shielding housing means; said fourth antenna means permitting transmission and reception to and from said second antenna means of said user portable communication device.

10. A vehicle as claimed in claim 9, characterized in that said fifth antenna means comprise a vehicle antenna.

11. A vehicle as claimed in claim 9, characterized in that said fourth antenna means comprise a horn antenna.

12. A vehicle as claimed in claim 9, characterized in that said fourth antenna means comprise a dipole antenna.

13. A vehicle as claimed in claim 9, characterized in that said fourth antenna means comprise a capacitive antenna.

14. A vehicle as claimed in claim 1, characterized in that said shielding housing means comprise at least one door by which to insert/remove said user portable communication device inside/from said shielding housing means.

15. A vehicle as claimed in claim 1, characterized in that said interface means are integrated in an on-vehicle computer of said vehicle, and in that said second communication means are integrated in said on-vehicle computer.

16. A vehicle as claimed in claim 1, characterized in that said second communication means are fixed to said shielding housing means.

17. A vehicle as claimed in claim 1, characterized in that said first and said second communication means permit radio-frequency communication to the Bluetooth or IEEE 802.11b short-range communication standard.

18. A vehicle as claimed in claim 1, characterized in that said user portable communication device is a cellular telephone.

* * * * *